United States Patent
Kalamatianos et al.

(10) Patent No.: US 10,671,535 B2
(45) Date of Patent: Jun. 2, 2020

(54) STRIDE PREFETCHING ACROSS MEMORY PAGES

(71) Applicant: Advanced Micro Devices, Inc., Sunnyvale, CA (US)

(72) Inventors: John Kalamatianos, Arlington, MA (US); Paul Keltcher, Lexington, MA (US); Marius Evers, Sunnyvale, CA (US); Chitresh Narasimhaiah, San Jose, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 796 days.

(21) Appl. No.: 13/944,148

(22) Filed: Jul. 17, 2013

(65) Prior Publication Data

US 2015/0026414 A1 Jan. 22, 2015

(51) Int. Cl.
*G06F 12/0862* (2016.01)
*G06F 12/06* (2006.01)

(52) U.S. Cl.
CPC .......... *G06F 12/0862* (2013.01); *G06F 12/06* (2013.01); *G06F 2212/1024* (2013.01); *G06F 2212/6026* (2013.01); *G06F 2212/655* (2013.01)

(58) Field of Classification Search
None
See application file for complete search history.

(56) References Cited

U.S. PATENT DOCUMENTS

| | | | |
|---|---|---|---|
| 4,722,047 A * | 1/1988 | Chan ................... | G06F 12/0292 711/201 |
| 2006/0004996 A1* | 1/2006 | Gonion ......................... | 712/241 |
| 2009/0198909 A1* | 8/2009 | Speight ............... | G06F 12/0862 711/137 |
| 2012/0254540 A1* | 10/2012 | Kou et al. ...................... | 711/122 |
| 2014/0006718 A1* | 1/2014 | Ramani-Augustin et al. ............. | 711/137 |
| 2014/0086241 A1* | 3/2014 | Assarpour ........... | H04L 12/4641 370/389 |
| 2014/0149679 A1* | 5/2014 | Rowlands et al. ............ | 711/137 |

* cited by examiner

*Primary Examiner* — Reginald G Bragdon
*Assistant Examiner* — James J. Thomas

(57) ABSTRACT

A prefetcher maintains the state of stored prefetch information, such as a prefetch confidence level, when a prefetch would cross a memory page boundary. The maintained prefetch information can be used both to identify whether the stride pattern for a particular sequence of demand requests persists after the memory page boundary has been crossed, and to continue to issue prefetch requests according to the identified pattern. The prefetcher therefore does not have re-identify a stride pattern each time a page boundary is crossed by a sequence of demand requests, thereby improving the efficiency and accuracy of the prefetcher.

17 Claims, 5 Drawing Sheets

| | RIP | PHYSICAL ADDRESS | STRIDE | CP | CONFIDENCE | REPLACE |
|---|---|---|---|---|---|---|
| 210 | 100 | 425 | 5 | 0 | 2 | 0 |
| 211 | 125 | 530 | 2 | 1 | 3 | 0 |
| 212 | 201 | 622 | 4 | 0 | 4 | 1 |

125

STRIDE PREFETCHING ACROSS MEMORY PAGES

BACKGROUND

Field of the Disclosure

The present disclosure relates generally to processing systems and more particularly to prefetching for processing systems.

Description of the Related Art

To improve processing efficiency, a processor typically employs a prefetcher that moves data expected to be demanded by an executing program thread to a cache, where it can be more quickly accessed once needed. In order to identify the data that is expected to be demanded, the prefetcher analyzes memory access requests ("demand requests") by the executing program thread to identify patterns in the memory addresses of the demand requests. An common type of prefetching based on patterns in the memory addresses of demand requests includes "stride prefetching," whereby the prefetcher identifies patterns in the differences ("strides") between memory addresses of successive demand requests and prefetches data based on the identified patterns.

In some processing systems, the executing program threads address memory based on a virtual address space, and an operating system (OS) executing at the processor maps the virtual address space to a set of physical addresses that identify memory locations in a memory hierarchy of the processing system. The physical addresses are typically organized into memory pages to facilitate efficient memory access. However, because sequential addresses in the virtual address space can refer to non-sequential memory pages in the physical address space, conventional prefetchers often are unable to properly identify memory access patterns for strides that cross memory page boundaries.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
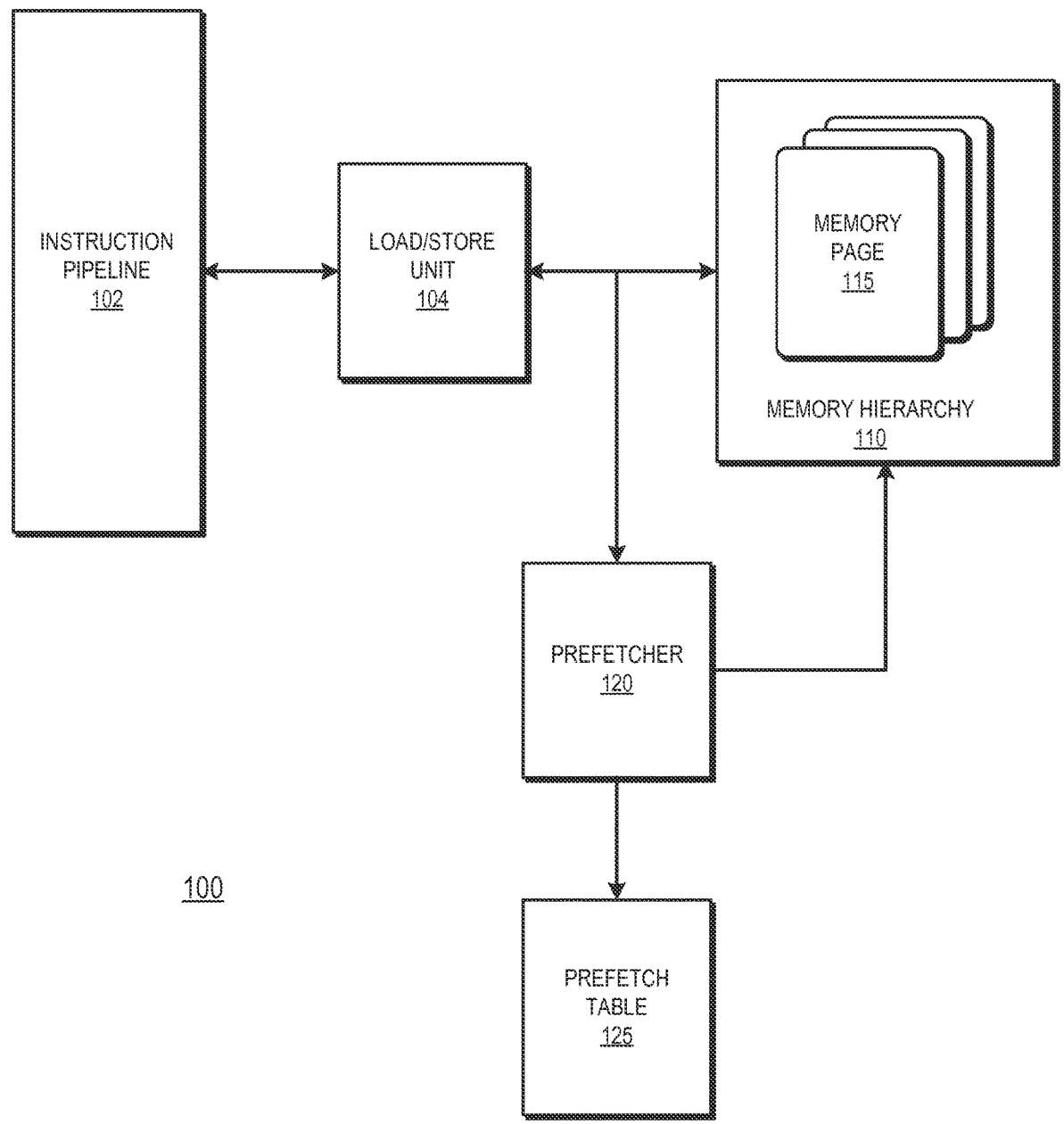
FIG. 1 is a block diagram of a processing system that performs stride prefetching across memory pages in accordance with some embodiments.

FIGS. 1-6 illustrate some embodiments of techniques to prefetch across memory pages by maintaining the state of stored prefetch information, such as a prefetch confidence level, when a prefetch would cross a memory page boundary. The maintained prefetch information can be used both to identify whether the stride pattern for a particular sequence of demand requests persists after the memory page boundary has been crossed, and to continue to issue prefetch requests according to the identified pattern. The prefetcher therefore does not have to re-identify a stride pattern each time a page boundary is crossed by a sequence of demand requests, thereby improving the efficiency and accuracy of the prefetcher.

For example, in some embodiments a prefetcher can store prefetch information for different sequences (referred to as prefetch streams) of demand requests (e.g. load and store operations) at a table, with each entry of the table storing a stride value representing the most recent stride of the associated prefetch stream, a prefetch confidence level, and other prefetch information for its associated prefetch stream. A prefetcher uses the stride value in an entry to prefetch data for the next demand request predicted to follow in the corresponding sequence. For demand requests targeted to a given memory page (referred to as "Page A"), the prefetcher identifies stride values between the demand requests, makes adjustments to the confidence level based on matches between successive stride values, and issues prefetch requests for data, using the most recent stride value, when the confidence level exceeds a threshold value.

When the prefetcher receives a demand request whereby the stride for the sequence would result in a prefetch targeted to a different memory page (referred to as "Page B"), the prefetcher sets a page crossing bit or other indicator in the sequence's prefetch table entry to indicate that a memory page has been crossed. In addition, the prefetcher suppresses the prefetch indicated by the stride for the prefetch stream, and maintains the other prefetch information at the sequence's prefetch table entry. When a subsequent demand request in the sequence that targets Page B is received, search logic links the address of the demand request with a prefetch table entry holding the last address of Page A. The prefetch information in that entry is updated as usual. In contrast, a conventional prefetcher discards the prefetch information when the prefetch stream of demand requests crosses the page boundary between Page A and Page B, requiring the prefetcher to re-identify any stride pattern for the prefetch stream based on demand requests to Page B only and thereby reducing prefetch efficiency.

To illustrate using an example, assume that the prefetcher will not issue a prefetch request for a prefetch stream until the confidence level for the prefetch stream is at least 3, indicating that at least three successive demand requests have had the same stride. Further, assume that, based on demand requests to Page A, the prefetcher has identified a confidence level of 4 for a given prefetch stream, designated "Stream 1" based on a stride value of 6. The confidence level and stride value are stored at a prefetch table. The next demand request (designated "Request 1") for Stream 1 targets Page A, has a stride of 6, and a memory address (designated "Address X") such that Address X+6 would target a location of Page B. Accordingly, the prefetcher does not issue a prefetch request for Address X+6, but increases the confidence level for the prefetch stream to 5, stores the new memory address X to the same prefetch table entry and maintains the stride value, confidence level, and other prefetch information for Stream 1 at the prefetch table entry. Assuming that the next demand request (designated "Request 2") targets Page B at a memory address designated "Address Y". If the computed stride between Address Y and Address X, as indicated by their page offset portions, is 6 then Address Y is associated with the prefetch table entry for Stream 1. Accordingly, the prefetcher increases the confidence level for Stream 1 to 6 and issues a prefetch request for Address Y+6 based on the confidence level for Stream 1 exceeding the threshold level of 3. In addition, Address Y is stored in the entry for Stream 1 so that subsequent demand requests with addresses in Page B will use the training information for Stream 1.

If, in contrast to the above example, the prefetcher had discarded the stored prefetch information for Stream 1 in response to Request 1 (because the prefetch request would have targeted Page B), the prefetch confidence for Stream 1 when Request 2 is received would be 0, and the prefetcher would issue no prefetch request in response to Request 2. Assuming that Stream 1 continues to have the same stride value of 6 for several more demand requests, it would require three additional demand requests to Page B to reacquire the threshold confidence level for Stream 1, thereby omitting useful prefetch requests for those 3 additional demand requests. Thus, by maintaining the stored prefetch information when a prefetch stream of demand requests crosses a memory page boundary, prefetch efficiency is improved.

FIG. 1 illustrates a block diagram of a processing system 100 having a prefetcher 120 that maintains stored prefetch information when a prefetch crosses a memory page boundary. The processing system 100 can be a portion of any of a variety of electronic devices, including a personal computer, server, gaming system, mobile phone, and the like. The processing system 100 generally is configured to execute sets of instructions, referred to as computer programs, in order to carry out tasks defined by the sets of instructions. Each of the sets of instructions can be divided into one or more subsets, referred to as program threads, whereby each program thread can be independently scheduled for execution by the processing system 100.

To facilitate execution of program threads, the processing system 100 includes one or more processor cores, with each having an instruction pipeline, such as instruction pipeline 102 illustrated at FIG. 1. The instruction pipeline 102 includes a number of stages to execute program threads, including a fetch stage to fetch instructions for execution, a decode stage to decode the fetched instructions into one or more operations, a dispatch stage to dispatch operations to one or more execution units of the instruction pipeline 102, where the operations are executed, and a retire stage to retire executed instructions.

The processing system 100 also includes a memory hierarchy 110 to store data for program threads. As used herein, "data" can refer to instruction data, representing the instructions that compose the program threads, and operand data, representing the data that is manipulated by executing instructions. The memory hierarchy 110 includes one or more storage devices, such as random access memory (RAM) modules, flash memory devices, hard disk drives, and the like, each configured to store data in response to received write requests and retrieve stored data in response to read requests. The memory hierarchy includes multiple memory structures, such as caches, main memory and disk storage arranged in a hierarchical fashion, whereby the lowest level of the hierarchy stores all data available to be locally accessed by the processing system 100, and each higher level in the hierarchy storing a subset of the data from the next highest level. For example, in some embodiments the memory hierarchy includes a level 1 (L1) cache at the highest level of the memory hierarchy, additional caches (e.g. a level 2 (L2) and a Level 3 (L3) cache) below the L1 cache, main memory below the caches, and disk storage below the main memory.

In some embodiments, data can be accessed (stored or retrieved) more quickly from higher levels of the memory hierarchy 110 than from lower levels. Accordingly, the memory hierarchy implements a caching scheme, whereby data that was more recently the target of a memory access request is moved to higher levels of the memory hierarchy 110. Thus, for example, the disk storage level of the memory hierarchy 110 can store all of the data locally available for execution of program threads. In response to a memory access request targeting a given memory location, data can be copied from the disk storage level to main memory, from main memory to the lowest level cache, from the lowest level cache to the next-higher level cache, and so on until it is copied to the highest level of the memory hierarchy 110. If, at any level of the memory hierarchy 110, the level is full of previously accessed data, a location at that level can be replaced according to a replacement policy for the level. For example, data at the cache levels of the memory hierarchy 110 can be replaced according to a least-recently-used (LRU) policy. Accordingly, each level of the memory hierarchy 110 will store the most recently accessed data up to the size of the level.

The location of each unit of data stored at the memory hierarchy 110 is identified by a particular type of memory address, referred to as a "physical memory address" or, more simply, a "physical address". The physical address of a unit of data identifies the location of the data at each level of the memory hierarchy 110. For example, a given unit of data can be located at an L1 cache, L2 cache, and at main memory based on the data's physical address. Accordingly, memory access requests to the memory hierarchy 110 identify the physical memory address of the memory location targeted by the memory access request so that the memory hierarchy 110 can access the memory location.

In order to improve processing efficiency, the processing system 100 can engage in speculative operations to move data higher in the memory hierarchy 110 in advance of an explicit memory access request (referred to as a demand request) from an executing program thread. For example, in some embodiments the data stored at the memory hierarchy 110 is organized into memory pages, such as memory page 115, whereby each page is delineated by corresponding physical addresses, referred to as page boundaries, and including the physical addresses between the page boundaries. Thus, for example, memory page 115 can be delineated by the page boundary physical addresses 100 and 150, and include the physical addresses 100100-100150. Transferring the data corresponding to all of the physical memory addresses in a memory page is referred to as "transferring the memory page." Because accessing the disk drive level of the memory hierarchy 110 can be relatively slow, an operating system (OS) or other program executing at the processing system 100 can speculatively transfer memory pages from the disk drive level of the memory hierarchy 110 to a higher level, such as the main memory level, where it can be more quickly accessed by an executing program thread.

In operation, in the course of executing program threads, the instruction pipeline 102 generates memory access requests (e.g. read and write requests) to retrieve and store data at the memory hierarchy 110. The memory access requests generated by the instruction pipeline are referred to as "demand requests" in that they demand data for an executing program based on an instruction that explicitly requests that data. Demand requests are distinguished from speculative memory access requests, such as prefetch requests, that request data expected to be the target of a demand request in the relatively near future.

In some embodiments, the program threads executing at the instruction pipeline 102 generate the demand requests based on a virtual address space composed of a set of addresses that identify locations of data used by the program. The virtual address space is abstracted from the set of physical addresses used to identify locations at the memory hierarchy 110 in order to simplify the design and development of the program threads. To facilitate access of the memory hierarchy 110, the processing system 100 includes a load/store unit (LSU) 104 that implements a mapping of the virtual address space to the physical addresses of the memory hierarchy 110. To illustrate, each demand request generated by the instruction pipeline 102 includes a virtual memory address indicating the location in the virtual address space of the data targeted by the demand request. The instruction pipeline 102 provides the demand request to the LSU 104, which translates the virtual address to a physical address. In some embodiments, the LSU 104 includes a cache memory, referred to as a translation look-aside buffer (TLB) (not shown), that stores a mapping of recently-received virtual addresses to physical memory addresses. The LSU 104 first attempts to translate a received virtual address to its corresponding physical address using the TLB. If the TLB does not store the virtual address, the LSU 104 employs translation logic to identify the physical address and stores the virtual address and its corresponding physical address at the TLB. The LSU 104 provides the demand request, with its corresponding physical address to the memory hierarchy 110.

In response to receiving a demand request, the memory hierarchy 110 identifies whether the data corresponding to the physical address is stored at the highest level of the hierarchy, assumed for purposes of description to be an L1 cache. If so, the memory hierarchy 110 satisfies the demand request, either by modifying the data at the L1 cache (in the case of a write request) or by retrieving the data from the L1 cache (in the case of a read request) and providing it to the LSU 104 for subsequent provision to the instruction pipeline 102. If the L1 cache does not store the data corresponding to the physical address, it passes the demand request to the next-lower level of the memory hierarchy 110, which attempts to satisfy the request. The demand request continues to be passed to lower levels of the memory hierarchy 110 until the data corresponding to the physical address is located. Upon locating the data, the memory hierarchy 110 copies the data to at least the L1 cache and satisfies the demand request as described above.

Because data can be more quickly accessed at the higher levels of the memory hierarchy 110, the processing system 100 employs the prefetcher 120 to speculatively move data expected to be the target of a demand request in the near future to these higher levels. The prefetcher 120 analyzes sets of demand requests, referred to as prefetch streams, issued by the LSU 104 to identified patterns in the prefetch streams. The prefetch streams can be organized according to an instruction pointer register (RIP) value that identifies the instruction pointer value for the instruction that generated the demand request, based on the memory page that is targeted by the demand request (i.e. the memory page that includes the physical address of the demand request) and the like. Based on the patterns identified in the prefetch streams, the prefetcher 120 issues prefetch requests to the memory hierarchy 110 to move data expected to be the target of demand requests higher in the memory hierarchy 110.

To assist in identifying patterns in the demand request prefetch streams, the prefetcher 120 employs a storage structure, illustrated as prefetch table 125, having a number of entries, with each entry corresponding to a different demand request prefetch stream. Each entry of the prefetch table 125 stores information, referred to as prefetch state information, to facilitate pattern identification in the corresponding prefetch stream. In some embodiments, in response to receiving a demand request, the prefetcher 120 determines an associated prefetch stream based on the identifier used to organize the prefetch streams, such as RIP value or physical page targeted by the demand request. The prefetcher 120 identifies whether an entry of the prefetch table 125 is allocated to the prefetch stream. If so, the prefetcher 120 updates the prefetch state information for the prefetch stream based on the demand request, as described further herein. If an entry of the prefetch table 125 has not been allocated to the prefetch stream, the prefetcher 120 allocates an entry to the prefetch stream and stores initial prefetch state information for the prefetch stream. Allocation of an entry to the prefetch stream may require eviction of the prefetch state information for another prefetch stream according to a replacement policy. For example, in some embodiments the prefetcher 120 evicts the prefetch stream whose prefetch state information has not been updated at the prefetch table 125 in the longest amount of time.

At least one of the pattern-identifying techniques employed by the prefetcher 120 is referred to as stride prefetching, whereby the prefetcher 120 identifies differences (strides) between the physical addresses of successive demand requests in a given prefetch stream and issues prefetch requests based on how often the stride value repeats for sequences of demand requests in the prefetch stream. To illustrate, in response to allocating an entry for a given prefetch stream at the prefetch table 125 based on a demand request (referred to as DR-A), the prefetcher 120 stores at the entry the physical address for DR-A. In response to receiving the next demand request in the prefetch stream (referred to as DR-B), the prefetcher 120 determines the stride between the physical addresses of DR-A and DR-B and stores the stride value and the physical address DR-B at the entry of the prefetch table 125. In response to receiving the next demand request in the prefetch stream (referred to as DR-C), the prefetcher 120 compares the stride value between the physical addresses of DR-B and DR-C with the stride value stored at the entry. The prefetcher 120 increases or decreases a confidence value at the entry of the prefetch table 125 based on whether or not the stride values match. In addition, the prefetcher 120 stores the newly determined stride value (the stride value between the physical addresses of DR-B and DR-C) and the physical address DR-C at the entry of the prefetch table 125. As the prefetcher 120 continues to receive demand requests of the prefetch stream, it continues to identify the stride values between successive demand requests, store the identified stride values, and adjust the confidence value based on matches in successive stride values. In response to the confidence level for a prefetch stream matching or exceeding a threshold level, the prefetcher 120 issues a prefetch request for the physical address corresponding to the physical address of the most recent demand request in the prefetch stream plus the most recently determined stride value.

To illustrate via an example, a given demand request prefetch stream may have successive stride values of 3, 3, 3, and 3, and the prefetcher 120 may have a confidence threshold level of 2. Accordingly, in response to receiving the fourth demand request in the prefetch stream (referred to as DR-D), the prefetcher 120 identifies that the threshold level of 2 has been matched and therefore issues a prefetch request for the physical address equal to the physical address of DR-D plus 3 (referred to as PA(D)+3), thereby moving the data at that physical address to a high level of the memory hierarchy 110. If the prefetch stream continues to exhibit the same stride pattern, a demand request will be issued for PA(D)+3. Because that data has been moved higher in the memory hierarchy 110, the demand request is more quickly satisfied than it would have been in the absence of the prefetch request.

A prefetch request crosses a memory page boundary when the physical address of the prefetch request is on a different memory page than the physical address of the demand request that caused the prefetch request to be generated. To illustrate with an example, a given demand request prefetch stream has a stride value of 5, and the prefetcher 120 receives a demand request in the prefetch stream having a physical address of 88, which lies on a memory page having page boundaries at physical addresses 60 and 90. Accordingly, if the confidence level stored at the prefetch table 125 exceeds the threshold level, the prefetcher 120 would generate a prefetch request targeted to physical address 93.

However, because of fragmentation in the virtual address space used by executing program threads, prefetch requests that cross memory pages can cause incorrect data to be moved up the memory hierarchy 110. For example, in some embodiments the virtual address space of an executing program thread is mapped to physical addresses such that differences in physical addresses in the same memory page match the differences in the corresponding virtual addresses in virtual address space, but because the memory pages are not contiguous relative to their corresponding virtual addresses, differences in physical addresses across memory pages will not match differences in the corresponding virtual addresses. For example, virtual addresses 101-150 may map to physical addresses 326-375, corresponding to one memory page (designated Memory Page 1), while virtual addresses 151-200 map to physical addresses 526-575, corresponding to a different memory page (designated Memory Page 2). A prefetch request to Memory Page 1 based on a stride and resulting from a demand request to Memory Page 1 will cause the correct data to be prefetched. However, because of the discontinuity between the physical addresses that form the boundaries of Memory Page 1 and Memory Page 2, if a demand request to Memory Page 1 causes a prefetch request that targets a different memory page, the prefetch request is likely to fetch incorrect data. For example, assuming a stride value of 8 for a given demand request prefetch stream, a demand request to physical address 370 (corresponding to virtual address 145) will cause a prefetch request that targets physical address 378. However, in order to prefetch the correct data, the prefetch request should target the physical address corresponding to virtual address 153; that is, the prefetch request should target the physical address 528.

In order to prevent prefetching of incorrect data, the prefetcher 120 suppresses any prefetch request that crosses a memory page boundary. The prefetch request can be suppressed by preventing the prefetch request from being communicated to the memory hierarchy 110, by setting an indicator in the prefetch request that causes the memory hierarchy 110 to ignore the prefetch request, and the like. By suppressing the prefetch request that crosses the memory page boundary, the prefetcher 120 prevents the wasteful consumption of resources at the memory hierarchy 110.

In addition, in order to continue pattern identification for the demand request prefetch stream that caused the suppressed prefetch request, the prefetcher 120 sets an indicator, referred to as the "cross-page (CP) indicator" at the prefetch stream's prefetch state information stored at the prefetch table 125, and maintains the other prefetch state information, such as the stride associated with the prefetch stream, the last address and the confidence level associated with the prefetch stream, the age of the prefetch stream (e.g. time information indicating how long since the last demand request for the prefetch stream was received at the prefetcher 120), and the like. When the next demand request for the prefetch stream is received (the association between the prefetch table entry holding the prefetch stream and the next demand request is indicated by the use of the same RIP), the prefetcher 120 identifies that the CP indicator for the prefetch stream is set. In response the prefetcher 120 identifies the stride value between the received demand request and the previous demand request as if they shared a memory page by computing the difference between their page offset bits. If the identified stride value matches the stride value stored at the prefetch table 125 for the demand request prefetch stream, the prefetcher 120 increases the stored confidence level and, if the confidence level exceeds the threshold, issues a stride prefetch request. Accordingly, the prefetcher 120 effectively updates the prefetch state information at the prefetch table 125 with the new address (which also changes the memory page), and maintains the other prefetch state information to continue the pattern identification for the demand request prefetch stream.

Figures 2, 6:
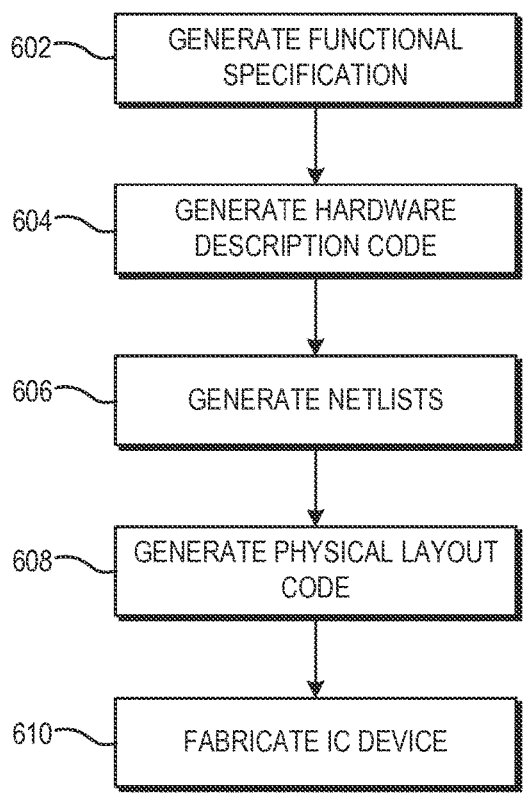
FIG. 2 is a block diagram of a prefetch table of FIG. 1 in accordance with some embodiments.
FIG. 6 is a flow diagram illustrating a method for designing and fabricating an integrated circuit device implementing at least a portion of a component of a processing system in accordance with some embodiments.

FIG. 2 illustrates an example of the prefetch table 125 including entries 210-212, wherein each entry stores prefetch state information for a different demand request prefetch stream. The prefetcher 120 includes columns 201-206, wherein column 201 identifies the RIP for the demand request prefetch stream corresponding to the entry, column 202 identifies the physical address of the most recent demand request in the prefetch stream corresponding to the entry, column 203 identifies a stride value for the prefetch stream corresponding to the entry, column 204 identifies the CP indicator for the entry, column 205 is the prefetch confidence level for the prefetch stream corresponding to the entry, and column 206 is replacement information for the entry, indicating whether the entry is eligible to be replaced by prefetch state information for another demand request prefetch stream.

The entries of the prefetch table 125 are updated as follows: in response to receiving a demand request (referred to as DR-A), the prefetcher 120 identifies (e.g. from a field in the demand request) the RIP for the instruction that generated the demand request and selects the entry that corresponds to the identified RIP. The selected entry stores prefetch state information based on a previously received demand request in the prefetch stream. For purposes of discussion, the previously received demand request is referred to as DR-A and the most recently received demand request is referred to as DR-B. The prefetcher 120 compares a portion of the physical address of DR-B to a portion of the physical address for DR-A as stored at column 202 to identify whether DR-A and DR-B access the same memory page. For example, in some embodiments the physical addresses of demand requests are 48 bits, wherein bits 47:12 indicate the page number (PN) of the memory page that includes the physical address, and bits 11:0 indicate the page offset (PPO) portion of the physical address that identifies where the physical address is located within the memory page. Accordingly, the prefetcher 120 identifies whether DR-A and DR-B have the same PN by comparing bits 47-12 of their respective physical addresses.

If DR-A and DR-B have the same PN, the prefetcher 120 identifies the stride value (S) at the selected entry of the prefetch table 125, and calculates the stride value S1 by subtracting the PPO for DR-A from the PPO for DR-B. If S1 does not match S, the prefetcher 120 decrements the confidence value for the selected entry and does not issue a prefetch request for the prefetch stream corresponding to the selected entry. If S1 matches S, the prefetcher 120 increments the confidence value at column 205 for the selected entry and identifies whether the confidence level exceeds the prefetch confidence threshold.

If the prefetch confidence level is exceeded, the prefetcher 120 calculates a prefetch address (PrA) by adding the value S to the physical address for DR-B. If PrA has the same PN as DR-B, the prefetcher 120 issues a prefetch request to the physical address PrA, and stores the physical address for DR-B at column 202 for the selected entry. If PrA has a different PN than the physical address for DR-B, a prefetch request to PrA would cross a memory page boundary. Accordingly, the prefetcher 120 suppresses a prefetch request to PrA and sets the CP indicator at column 205 for the selected entry. In addition, the prefetcher 120 stores the physical address for DR-B at column 202 for the selected entry.

If DR-A and DR-B do not have the same PN, the prefetcher 120 identifies whether the CP indicator at column 204 has been set. If so, the prefetcher 120 adds the value S from column 203 to the PPO for DR-A and compares the result to the PPO for DR-B. If there is a match, the prefetcher 120 identifies that the stride S has continued across a memory page boundary, and therefore issues a prefetch request to PrA (i.e. to the physical address resulting from adding the stride value S to the physical address for DR-B). Thus, the prefetch state information for a prefetch stream is preserved when a memory page is crossed by a demand request prefetch stream so that, if the stride of the prefetch stream is consistent across the memory pages, the identification of the stride pattern is not lost and prefetching resumes according to the pattern without having to re-identify the stride pattern.

Figure 3:
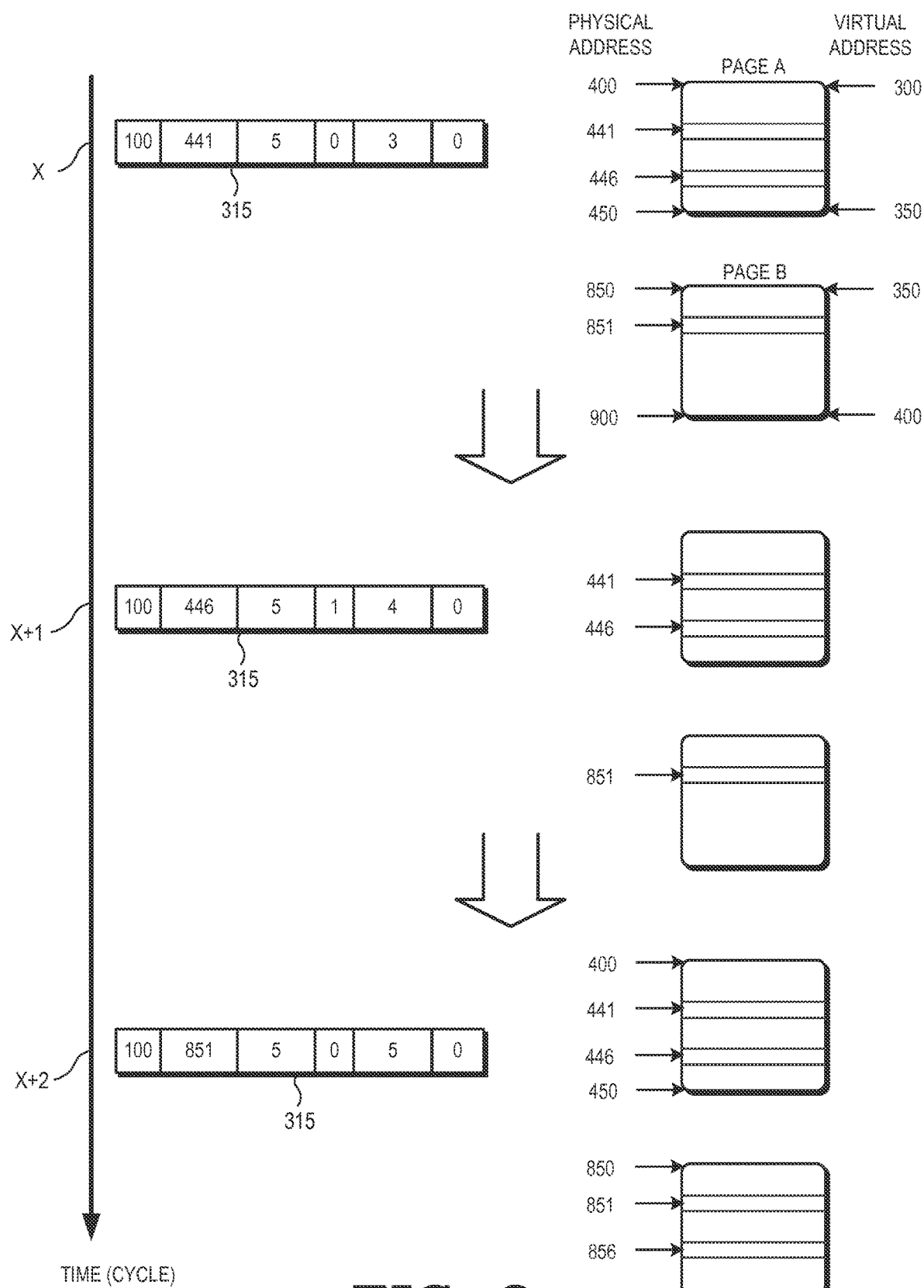
FIG. 3 is a diagram illustrating an example of stride prefetching across memory pages using a prefetch table that indexes its entries according to an instruction pointer in accordance with some embodiments.

FIG. 3 illustrates an example of updating an entry 315 of the prefetch table 125 in accordance with some embodiments. In the illustrated example, time is delineated by cycles which can be, for example, cycles of a clock in a processing system. FIG. 3 illustrates the updating of the entry 315 based on demand requests to two memory pages, designated "Page A" and "Page B". Page A is delineated by the page boundary physical addresses 400 and 450, and is delineated by the virtual addresses 300 and 350. Page B is delineated by the page boundary physical addresses 850 and 900 and by the virtual addresses 350 and 400. Thus, Page A and Page B are contiguous in the virtual address space and are not contiguous in the physical address space.

In the illustrated example, at cycle X the entry 315 stores prefetch state information based on DR-A targeting a physical address 441, which lies in Page A. At cycle X, DR-B is received, having a physical address 446. The prefetcher 120 determines that the PN for DR-B matches the PN for DR-A, and that the stride value S1, i.e. 5, matches the stride value stored at entry 315. Accordingly, the prefetcher 120 increments the confidence value at entry 315. The prefetcher 120 also determines, by adding the stride value of 5 to the physical address for DR-B, that a prefetch request based on DR-B would target physical address 451, which does not lie within Page A. Accordingly, at cycle X+1 the prefetcher 120 sets the CP indicator at entry 315 to 1 and suppresses a prefetch request based on DR-B.

At cycle X+2, the prefetcher 120 receives a demand request (designated "DR-C") in the demand request prefetch stream corresponding to entry 315 because the RIP of DR-B matches that of DR-C. DR-C has a physical address of 851. The prefetcher 120 identifies that the PN for DR-C corresponds to Page B. Because the CP indicator is set at entry 315, the prefetcher 120 adds the offset value for DR-B (i.e. 46) to the stride value 5 stored at the entry 315, and compares the result (51) to the offset value for DR-C. Because these values match, the prefetcher 120 identifies that the stride for the demand request prefetch stream has continued across memory page boundaries. Accordingly, the prefetcher 120 calculates the next prefetch address by adding the stride value of 5 to the physical address for DR-C, and issues a prefetch request to the resulting address of 856. In addition, the prefetcher 120 increments the confidence value at entry 315 and updates the physical address stored at entry 315 to 851.

Figure 4:
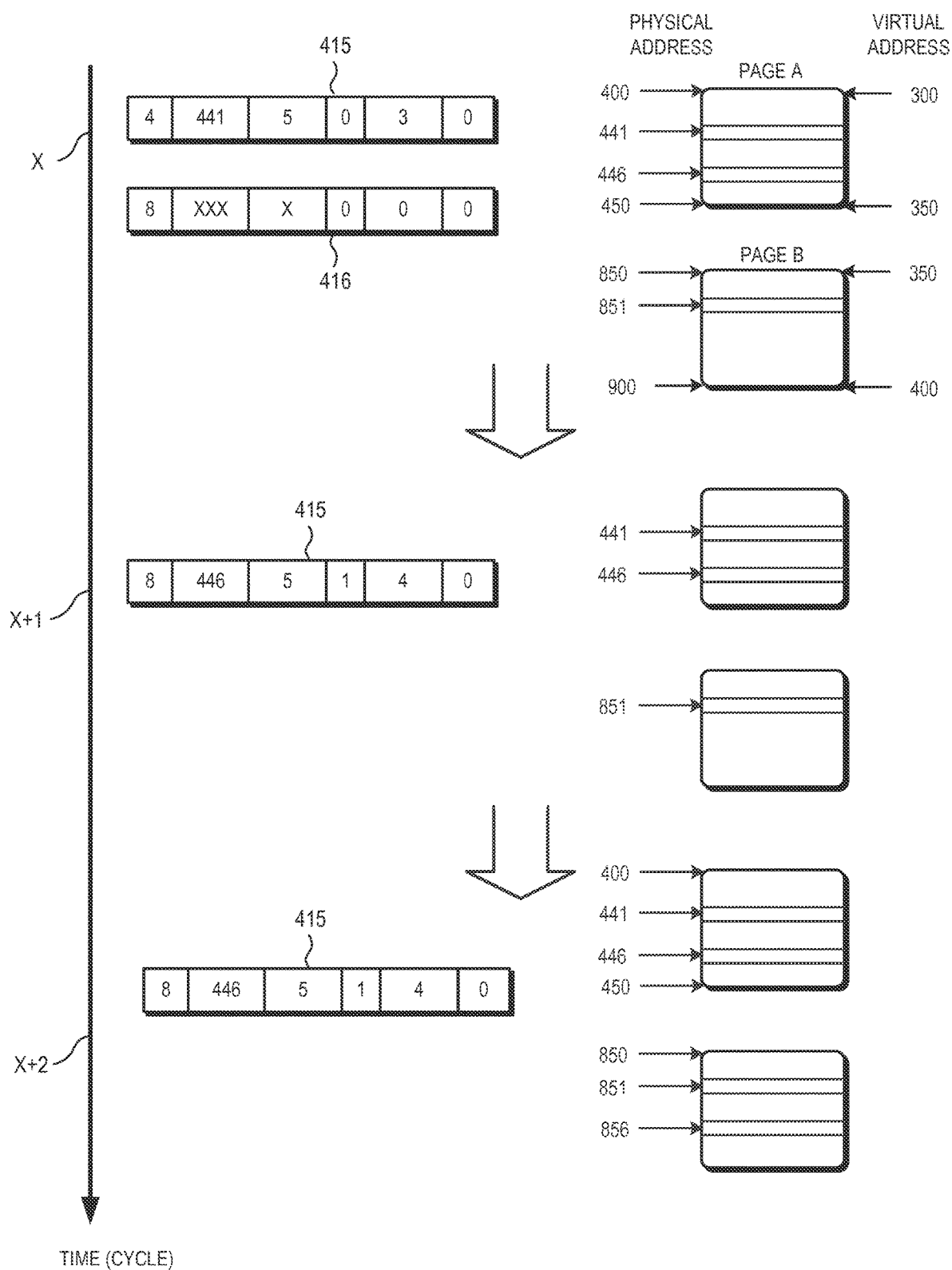
FIG. 4 is a diagram illustrating an example of stride prefetching across memory pages using a prefetch table that indexes its entries according to physical memory page number in accordance with some embodiments.

In some embodiments, the prefetch table 125 organizes demand request prefetch streams according to the PN of the memory page accessed by the demand request. Accordingly, column 201 (FIG. 2) of each entry indicates the PN for the corresponding prefetch stream. FIG. 4 illustrates an example of updating the prefetch table 125 when the demand request prefetch streams are organized according to PN in accordance with some embodiments. In the illustrated example, at cycle X the entry 415 stores prefetch state information based on DR-A targeting a physical address 441, which lies on Page A.

At cycle X the prefetcher 120 receives a demand request DR-B that targets physical address 446. The prefetcher 120 determines that the PN for DR-B matches the PN for DR-A, and that the stride value S1, i.e. 5, matches the stride value stored at entry 415. Accordingly, the prefetcher 120 increments the confidence value at entry 415. The prefetcher 120 also determines, by adding the stride value of 5 to the physical address for DR-B, that a prefetch request based on DR-B would target physical address 451, which lies within Page B. Accordingly, at cycle X+1 the prefetcher 120 sets the CP indicator at entry 415 to 1, sets the PN number at the entry 415 to the PN for Page B and suppresses a prefetch request based on DR-B.

At cycle X+2, the prefetcher 120 receives a demand request (designated "DR-C") that targets a physical address of 851. The prefetcher 120 identifies that the PN for DR-C corresponds to Page B. In addition, because the CP indicator at entry 415 is set, the prefetcher 120 adds the offset value for DR-B (i.e. 46) to the stride value 5 stored at the entry 415, and compares the result (51) to the offset value for DR-C. Because these values match, the prefetcher 120 identifies that the stride for the demand request prefetch stream has continued across memory page boundaries. Accordingly, the prefetcher 120 increments the confidence value at entry 416 and updates the physical address stored at entry 415 to 856. The prefetcher 120 then identifies the prefetch address by adding the stride value of 5 to the physical address for DR-C, and issues a prefetch request to the resulting address of 856.

In some scenarios, the physical address for a received demand request can match different demand access prefetch streams corresponding to different entries of the prefetch table 125. For example, in some scenarios, a physical address for a received demand request can match at least three different entries of the prefetch table 125, as follows: 1) the entry of the prefetch table 125 where address B is stored because PPO(B)+S=PPO(C), CP=1, and PN(B) is different than (PN(C); 2) the entry of the prefetch table 125 where address B1 is stored because PPO(B1)+S1=PPO(C), CP=1 and PN(C) is different than PN(B1); and 3) the entry of the prefetch table 125 where address B2 is stored because PPO(B2)+S2=PPO(C), PN(B2) is the same as PN(C), and CP=0. In some embodiments, when a received demand request matches the third case of the above entries, the prefetcher 120 selects the entry that corresponds to the third case regardless of the other two cases, as no page crossing has occurred.

In some embodiments, the first and second cases can occur when DR-C is such that it causes a match of the stride for 2 distinct entries of the prefetch table 125 (which cover 2 unique physical pages) and a prefetch request based on each stride for the entries would result in the crossing of a memory page. In the event that the first and second cases occur, but the third does not, the prefetcher 120 selects the most recently modified of the two entries for modification.

Figure 5:
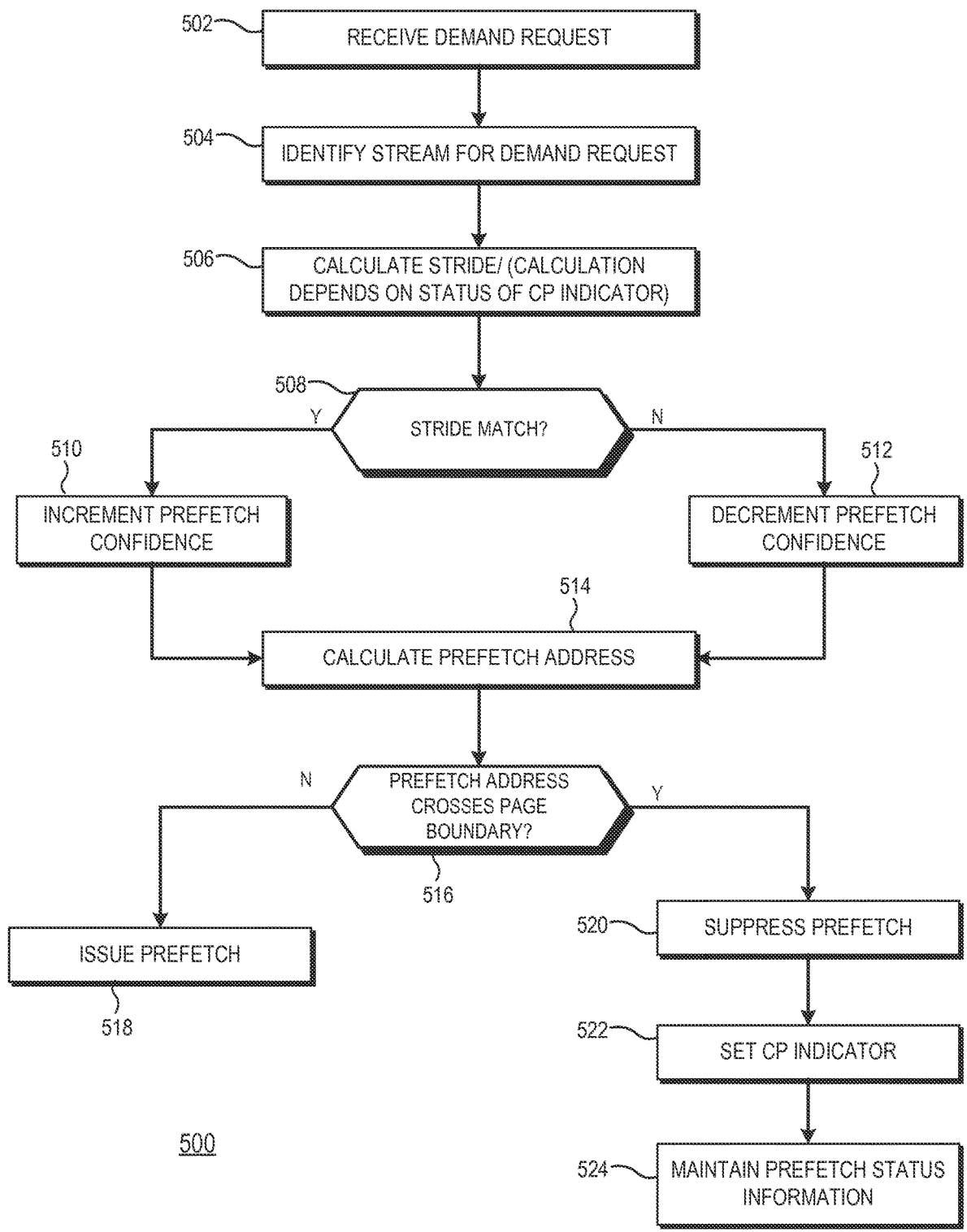
FIG. 5 is a flow diagram illustrating a method of maintaining stored prefetch information when a prefetch would cross a memory page boundary in accordance with some embodiments.

FIG. 5 illustrates a flow diagram of a method 500 of maintaining stored prefetch information when a prefetch would cross a memory page boundary in accordance with some embodiments. For purposes of description, the method 500 is described with respect to an example implementation at the processing system 100 of FIG. 1. At block 502, the prefetcher 120 receives a demand request. At block 504 the prefetcher 120 identifies the demand request prefetch stream for the demand request by, for example, comparing an instruction pointer value for the demand request to the instruction pointer values at the entries of the prefetch table 125. The prefetcher 120 also identifies the entry of the prefetch table 125 corresponding to the identified demand request prefetch stream.

At block 506, if the CP indicator at the entry of the prefetch table 125 is not set, the prefetcher 120 identifies the stride value S1 by subtracting the physical address stored at the identified entry of the prefetch table 125 and the physical address for the received demand request. If the CP indicator at the entry of the prefetch table 125 is set, the prefetcher 120 identifies a stride value S1 by subtracting the page offset value stored at the identified entry of the prefetch table 125 from the page offset for the physical address of the received demand request.

At block 508, the prefetcher 120 identifies whether there is a stride match. A stride match occurs when the value S1 matches the stride value S stored at the identified entry of the prefetch table 125. If there is a stride match the confidence value stored at the identified entry of the prefetch table 125 is incremented at block 510 and, if there is not a stride match the confidence value is decremented at block 512.

At block 514, if the stored confidence value exceeds a threshold level, the prefetcher 120 identifies a prefetch address by adding the stride value S to the physical address of the received demand request. At block 516, the prefetcher 120 identifies whether a prefetch request using the prefetch address would cross a memory page boundary. If the prefetch request would not cross the memory page boundary, the method flow moves to block 518 and the prefetcher 120 issues the prefetch request using the prefetch address. If, at block 516, the prefetch request is found to cross the memory page boundary, the method flow moves to block 520 and the prefetcher 120 suppresses the prefetch request by, for example, not issuing the prefetch request to the memory hierarchy 110. The method flow proceeds to block 522 and the prefetcher 120 sets the CP indicator at the entry of the prefetch table 125. In addition, at block 524 the prefetcher 120 maintains (e.g. does not invalidate) the prefetch information at the selected entry of the prefetch table 125, so that strides across the memory page boundary can be identified and pattern identification for the demand request prefetch stream is maintained.

In some embodiments, the apparatus and techniques described above are implemented in a system comprising one or more integrated circuit (IC) devices (also referred to as integrated circuit packages or microchips), such as the processor and processing system described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

FIG. 6 is a flow diagram illustrating an example method 600 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   identifying, at a processor, a first stride value based on a first memory access request to a first memory page;
   in response to a sum of the first stride value and a physical memory address of the first memory access exceeding a page boundary of the first memory page, maintaining a first prefetch confidence associated with the first memory access; and
   in response to a second memory access to a second memory page subsequent to the first memory access:
     identifying an offset portion of the physical memory address of the first memory access;
     identifying a sum value equal to a sum of the offset portion of the physical memory address of the first memory access and the first stride value;
     in response to the sum value matching an offset portion of a second physical memory address of the second memory access, matching a second stride value for the second memory access to the first stride value; and prefetching data from a memory based on the maintained first prefetch confidence in response to the second stride value matching the first stride value.

2. The method of claim 1, wherein the second memory page is not contiguous to the first memory page in a physical address space of the processor.

3. The method of claim 1, further comprising increasing the first prefetch confidence in response to the second stride value matching a third stride value associated with a third memory access request.

4. The method of claim 1, further comprising:
suppressing a prefetch in response to the sum of the first stride value and the physical memory address of the first memory access exceeding the page boundary of the first memory page.

5. The method of claim 1, wherein prefetching data in response to the second memory access further comprises:
increasing the first prefetch confidence to generate a second prefetch confidence in response to the second stride value matching the first stride value; and
prefetching the data in response to the second prefetch confidence exceeding a threshold.

6. The method of claim 1, wherein prefetching data in response to the second memory access comprises:
identifying a first page number for the first memory page and a second page number for the second memory page; and
prefetching the data in response to:
the first page number matching the second page number.

7. The method of claim 1, further comprising:
storing prefetch information in response to the first memory access, the prefetch information identifying the first prefetch confidence; and
maintaining a least-recently-used status of the stored prefetch information in response to the sum of the first stride value and the physical memory address of the first memory access exceeding the page boundary of the first memory page.

8. A method, comprising:
in response to a first memory access to a first memory page:
identifying a first stride for a first prefetch stream associated with the first memory access;
in response to a sum of the stride and a first physical memory address for the first memory access exceeding a page boundary of the first memory page, maintaining a stored prefetch confidence for the first prefetch stream, the stored prefetch confidence indicative of a threshold to identify whether data is to be prefetched from a memory; and
in response to a second memory access to a second memory page:
identifying an offset portion of the first physical memory address of the first memory access;
identifying a sum value equal to a sum of the offset portion of the first physical memory address of the first memory access and the first stride;
in response to the sum value matching an offset portion of a second physical memory address of the second memory access, matching a second stride for the second memory access to the first stride; and
prefetching data from a memory based on the maintained first prefetch confidence in response to the second stride matching the first stride.

9. The method of claim 8, wherein identifying the first prefetch stream comprises identifying the first prefetch stream based on an instruction pointer for the first memory access.

10. The method of claim 8, further comprising:
identifying the first prefetch stream based on a first page number identifier for the first memory page.

11. The method of claim 10, further comprising:
matching the second memory access to the first prefetch stream in response to the second memory page matching the first memory page.

12. The method of claim 10, further comprising:
in response to the second memory access to the second memory page:
identifying a first sum value based on a sum of the first stride and an offset portion of the first physical memory address;
identifying a second sum value based on a sum of the second stride and an offset portion of a third physical memory address associated with a second prefetch stream;
matching the second memory access to the first prefetch stream in response to the second memory page being different from the first memory page and the first sum value matching an offset portion of a second physical memory address for the second memory access;
matching the second memory access to the second prefetch stream in response to the second memory page not matching the first memory page and the second sum value matching an offset portion of the second physical memory address;
in response to matching the second memory access to the first prefetch stream and to the second prefetch stream selecting one of the first prefetch stream and the second prefetch stream based on which of the first prefetch stream and the second prefetch stream is associated with a more recent memory access; and
prefetching data from a memory based on a prefetch confidence for the selected prefetch stream.

13. A device, comprising:
a processor core to generate a plurality of memory access requests comprising a first memory access request and a second memory access request subsequent to the first memory access request;
a prefetch table to store prefetch state information for the plurality of memory access requests including a first prefetch confidence; and
a prefetcher to:
identify a first stride value based on the first memory access request accessing a first memory page;
in response to a sum of the first stride value and a physical memory address of the first memory access exceeding a page boundary of the first memory page, maintaining the first prefetch confidence at the prefetch table; and
in response to the second memory access request accessing a second memory page:
identify an offset portion of the physical memory address of the first memory access;
identify a sum value equal to a sum of the offset portion of the physical memory address of the first memory access and the first stride value;
in response to the sum value matching an offset portion of a second physical memory address of the second memory access, match a second stride value for the second memory access to the first stride value; and prefetch data from a memory based on the maintained first prefetch confidence in response to the second stride value matching the first stride value.

14. The device of claim 13, wherein the second memory page is non-sequential to the first memory page in a memory page order organized by an operating system executing at the processor core.

15. The device of claim 13, wherein the prefetcher is to:
increase the first prefetch confidence in response to the second stride value matching a third stride value associated with a third memory access request.

16. The device of claim 13, wherein the prefetcher is to:
suppress a prefetch in response to the sum of the first stride value and the physical memory address of the first memory access exceeding the page boundary of the first memory page.

17. The device of claim 13, wherein the prefetcher is to prefetch data in response to the second memory access by:
increasing the first prefetch confidence in response to a second stride value associated with the second memory access matching the first stride value to identify a second prefetch confidence; and
prefetching the data in response to the second prefetch confidence exceeding a threshold.

* * * * *